US009613587B2

(12) United States Patent
Halfman et al.

(10) Patent No.: US 9,613,587 B2
(45) Date of Patent: Apr. 4, 2017

(54) APPARATUS AND METHOD FOR ADAPTIVE IMAGE RENDERING BASED ON AMBIENT LIGHT LEVELS

(71) Applicant: Pixtronix, Inc., San Diego, CA (US)

(72) Inventors: Mark Douglas Halfman, Newtonville, MA (US); Edward Buckley, Melrose, MA (US); Nakano Taketoshi, Tokyo (JP); Brian Finkel, Acton, MA (US); James Eakin, Worcester, MA (US); Jignesh Gandhi, Burlington, MA (US); Alan Gerald Lewis, Sunnyvale, CA (US); Robert Myers, Andover, MA (US); Fahri Yaras, Chelsea, MA (US); John Fijol, Shrewsbury, MA (US)

(73) Assignees: SNAPTRACK, INC., San Diego, CA (US); SHARP CORPORATION, Osaka (JP)

( * ) Notice: Subject to any disclaimer, the term of this patent is extended or adjusted under 35 U.S.C. 154(b) by 31 days.

(21) Appl. No.: 14/601,065

(22) Filed: Jan. 20, 2015

(65) Prior Publication Data

US 2016/0210934 A1    Jul. 21, 2016

(51) Int. Cl.
*G09G 5/02* (2006.01)
*G09G 5/06* (2006.01)
(Continued)

(52) U.S. Cl.
CPC ............ *G09G 5/02* (2013.01); *G06K 9/4661* (2013.01); *G06T 1/20* (2013.01); *G06T 1/60* (2013.01);
(Continued)

(58) Field of Classification Search
None
See application file for complete search history.

(56) References Cited

U.S. PATENT DOCUMENTS

| 7,167,190 | B2 | 1/2007 | Ito et al. |
| 8,125,473 | B2 | 2/2012 | Chung et al. |

(Continued)

OTHER PUBLICATIONS

International Search Report and Written Opinion—PCT/US2015/065882—ISA/EPO—Mar. 4, 2016.

*Primary Examiner* — Martin Mushambo
(74) *Attorney, Agent, or Firm* — Foley & Lardner LLP; Paul S. Hunter; Chase S. Means

(57) ABSTRACT

This disclosure provides systems, methods and apparatus, including computer programs encoded on computer storage media, for enhancing display viewability in high ambient conditions without excessive increase in power consumption. In one aspect, a controller associated with the display device can be configured to obtain an indication of ambient light conditions from an ambient light sensor or from a host device hosting the display device. Upon receiving an image frame, the controller can derive a set of color subfields and determine a bit-depth value for each color subfield based on the obtained indication of current ambient light conditions and mapping data which maps ranges of ambient light to respective bit-depth values on a color subfield by color subfield basis. The controller can then generate a number of subframes for each color subfield based on the respective determined bit-depth value and cause the generated subframes to be displayed.

30 Claims, 8 Drawing Sheets

(51) Int. Cl.
  *G06K 9/46* (2006.01)
  *G09G 5/10* (2006.01)
  *G06T 1/20* (2006.01)
  *G06T 1/60* (2006.01)
  *G09G 3/20* (2006.01)
  *G09G 3/34* (2006.01)

(52) U.S. Cl.
  CPC ............ *G09G 3/3433* (2013.01); *G09G 5/06* (2013.01); *G09G 5/10* (2013.01); *G09G 3/2022* (2013.01); *G09G 3/2044* (2013.01); *G09G 3/3406* (2013.01); *G09G 2310/0235* (2013.01); *G09G 2320/0646* (2013.01); *G09G 2340/0428* (2013.01); *G09G 2360/144* (2013.01); *G09G 2360/16* (2013.01)

(56) References Cited

U.S. PATENT DOCUMENTS

| | | | |
|---|---|---|---|
| 2005/0231457 A1* | 10/2005 | Yamamoto | G09G 3/3413 345/102 |
| 2006/0055629 A1 | 3/2006 | Van | |
| 2007/0132680 A1 | 6/2007 | Kagawa et al. | |
| 2011/0205259 A1 | 8/2011 | Hagood | |
| 2012/0287144 A1* | 11/2012 | Gandhi | G09G 3/2029 345/589 |
| 2014/0210802 A1* | 7/2014 | Myers | G09G 3/3413 345/207 |
| 2015/0015599 A1 | 1/2015 | Yaras et al. | |

\* cited by examiner

| AMBIENT LEVEL (LUX) | RED | GREEN | BLUE | X-Channel |
|---|---|---|---|---|
| 0 -- 99 | 7 | 7 | 7 | 4 |
| 100 -- 999 | 7 | 7 | 6 | 4 |
| 1000 -- 9999 | 6 | 7 | 5 | 4 |
| 100000 ≥ | 4 | 6 | 3 | 4 |

610

| AMBIENT LEVEL (LUX) | RED | GREEN | BLUE | X-Channel |
|---|---|---|---|---|
| 0 -- 99 | 7 | 7 | 7 | 4 |
| 100 -- 999 | 6 | 7 | 5 | 4 |
| 1000 -- 9999 | 6 | 6 | 4 | 4 |
| 100000 ≥ | 3 | 5 | 2 | 4 |

APPARATUS AND METHOD FOR ADAPTIVE IMAGE RENDERING BASED ON AMBIENT LIGHT LEVELS

TECHNICAL FIELD

This disclosure relates to the field of displays, and in particular, to image formation processes used by displays.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, other micromachining processes or a combination thereof. Micromachining processes can etch away parts of substrates or deposited material layers, or can add layers to form electrical and electromechanical devices.

Display devices can generate images by controlling light emitted or reflected through each pixel of a display panel. Transmissive display devices such as EMS-based display devices include display elements that modulate light emitted from a backlight to generate an image. Reflective display devices selectively reflect light from the ambient or a front light to form an image.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus including a memory component and a controller. The memory component can store mapping data, which maps a plurality of ambient illumination ranges to respective bit-depth values for each component color subfield of a plurality of component color subfields used to display an image. The mapping data includes a first bit-depth value associated with a first component color subfield of the component color subfields and mapped to an ambient illumination range, and a second bit-depth value, different than the first bit-depth value, associated with a second component color subfield of the component color subfields and mapped to that ambient illumination range. The controller is configured to obtain an indication of an ambient illumination level, receive image data associated with an image frame and derive pixel intensity values for the component color subfields based on the received image data for displaying the image frame. The controller also is configured to determine for each of the component color subfields a respective number of subframes to be generated, using the mapping data and the obtained ambient illumination level. The controller also can generate a set of subframes for each color component subfield based on the determined respective number of subframes and display the image frame according to the determined numbers of subframes.

In some implementations, the mapping data includes a lookup table (LUT). In some other implementations, the mapping data includes multiple LUTs, such that each LUT includes different mappings of ambient illumination ranges to respective numbers of subframes to be generated for the component color subfields. The controller can select an LUT of the multiple LUTs based on at least one criterion. The at least one criterion can include an application type associated with the image frame, a battery power level, user preferences, user modes, color composition of the image frame, a color of a composite color employed in rendering the image frame or a combination thereof.

In some implementations, within an ambient illumination range, a first bit-depth value for a first component color subfield associated with a first luminance coefficient is smaller than a second bit-depth value for a second component color subfield associated with a second luminance coefficient larger than the first luminance coefficient. In some implementations, within an ambient illumination range, a first bit-depth value for a first component color subfield associated with a first light source with a nonlinear relationship between respective input power and output light intensity is greater than a second bit-depth value for a second component color subfield associated with a second light source with a linear relationship between respective input power and output light intensity.

In some implementations, the controller can further apply a spatial dithering process to at least one component color subfield. In some implementations, the controller can further obtain illumination time durations associated with the generated subframes. In some implementations, in generating the number of subframes, the controller is further configured to update the derived component color subfields based on the determined numbers of subframes.

In some implementations, the apparatus further include a display having a plurality of display elements, a processor and a memory device. The processor is capable of communicating with the display and processing image data. The memory device is capable of communicating with the processor. The apparatus can further include a driver circuit capable of sending at least one signal to the display. The controller is capable of sending at least a portion of the image data to the driver circuit. The apparatus can further include an image source module capable of sending the image data to the processor. The image source module can include at least one of a receiver, transceiver, and transmitter. The apparatus can further include an input device capable of receiving input data and communicating the input data to the processor.

Another innovative aspect of the subject matter described in this disclosure can be implemented in a non-transitory computer-readable medium with computer code instructions stored thereon. The computer code instructions when executed cause a processor to obtain an indication of an ambient illumination level, receive image data associated with an image frame and derive pixel intensity values for a plurality of component color subfields based on the received image data for displaying the image frame. apparatus including a memory component and a controller. The computer code instructions also cause the processor to determine for each of the component color subfields a respective number of subframes to be generated, using the obtained illumination level and mapping data. The mapping data maps a plurality of ambient illumination ranges to respective bit-depth values for each component color subfield of the plurality of component color subfields. The mapping data includes a first bit-depth value associated with a first component color subfield of the component color subfields and mapped to an ambient illumination range, and a second bit-depth value, different than the first bit-depth value, associated with a second component color subfield of the component color subfields and mapped to that ambient illumination range. The computer code instructions also cause the processor to generate a set of subframes for each component color subfield based on the determined respective number of subframes and display the image frame according to the determined numbers of subframes.

In some implementations, the mapping data includes a lookup table (LUT). In some other implementations, the mapping data includes multiple LUTs, such that each LUT includes different mappings of ambient illumination ranges to respective numbers of subframes to be generated for the component color subfields. The controller can select an LUT of the multiple LUTs based on at least one criterion. The at least one criterion can include an application type associated with the image frame, a battery power level, user preferences, user modes, color composition of the image frame, a color of a composite color employed in rendering the image frame or a combination thereof.

In some implementations, within an ambient illumination range, a first bit-depth value for a first component color subfield associated with a first luminance coefficient is smaller than a second bit-depth value for a second component color subfield associated with a second luminance coefficient larger than the first luminance coefficient. In some implementations, within an ambient illumination range, a first bit-depth value for a first component color subfield associated with a first light source with a nonlinear relationship between respective input power and output light intensity is greater than a second bit-depth value for a second component color subfield associated with a second light source with a linear relationship between respective input power and output light intensity.

In some implementations, the computer code instruction can further cause the processor to apply a spatial dithering process to at least one component color subfield. In some implementations, the computer code instruction can further cause the processor to obtain illumination time durations associated with the generated subframes. In some implementations, generating the number of subframes includes updating the derived component color subfields based on the determined numbers of subframes.

Another innovative aspect of the subject matter described in this disclosure can be implemented in an apparatus including means for storing mapping data, which maps a plurality of ambient illumination ranges to respective bit-depth values for each component color subfield of a plurality of component color subfields used to display an image. The mapping data includes a first bit-depth value associated with a first component color subfield of the component color subfields and mapped to an ambient illumination range, and a second bit-depth value, different than the first bit-depth value, associated with a second component color subfield of the component color subfields and mapped to that ambient illumination range. The apparatus also includes for obtain an indication of an ambient illumination level, means for receiving image data associated with an image frame and means for deriving pixel intensity values for the component color subfields based on the received image data for displaying the image frame. The apparatus also includes means for determining for each of the component color subfields a respective number of subframes to be generated, using the mapping data and the obtained ambient illumination level. The apparatus also includes means for generating a set of subframes for each color component subfield based on the determined respective number of subframes and means for displaying the image frame according to the determined numbers of subframes.

In some implementations, the mapping data includes a lookup table (LUT). In some other implementations, the mapping data includes multiple LUTs, such that each LUT includes different mappings of ambient illumination ranges to respective numbers of subframes to be generated for the component color subfields. The controller can select an LUT of the multiple LUTs based on at least one criterion. The at least one criterion can include an application type associated with the image frame, a battery power level, user preferences, user modes, color composition of the image frame, a color of a composite color employed in rendering the image frame or a combination thereof.

In some implementations, within an ambient illumination range, a first bit-depth value for a first component color subfield associated with a first luminance coefficient is smaller than a second bit-depth value for a second component color subfield associated with a second luminance coefficient larger than the first luminance coefficient. In some implementations, within an ambient illumination range, a first bit-depth value for a first component color subfield associated with a first light source with a nonlinear relationship between respective input power and output light intensity is greater than a second bit-depth value for a second component color subfield associated with a second light source with a linear relationship between respective input power and output light intensity.

In some implementations, the apparatus can further include means for applying a spatial dithering process to at least one component color subfield. In some implementations, the apparatus can further include means for obtaining illumination time durations associated with the generated subframes. In some implementations, the means for generating the number of subframes include means for updating the derived component color subfields based on the determined numbers of subframes.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 shows two example lookup tables (LUTs) mapping ambient light level ranges to respective bit-depth values for multiple color subfields.

Like reference numbers and designations in the various drawings indicate like elements.

DETAILED DESCRIPTION

Figure 1A:
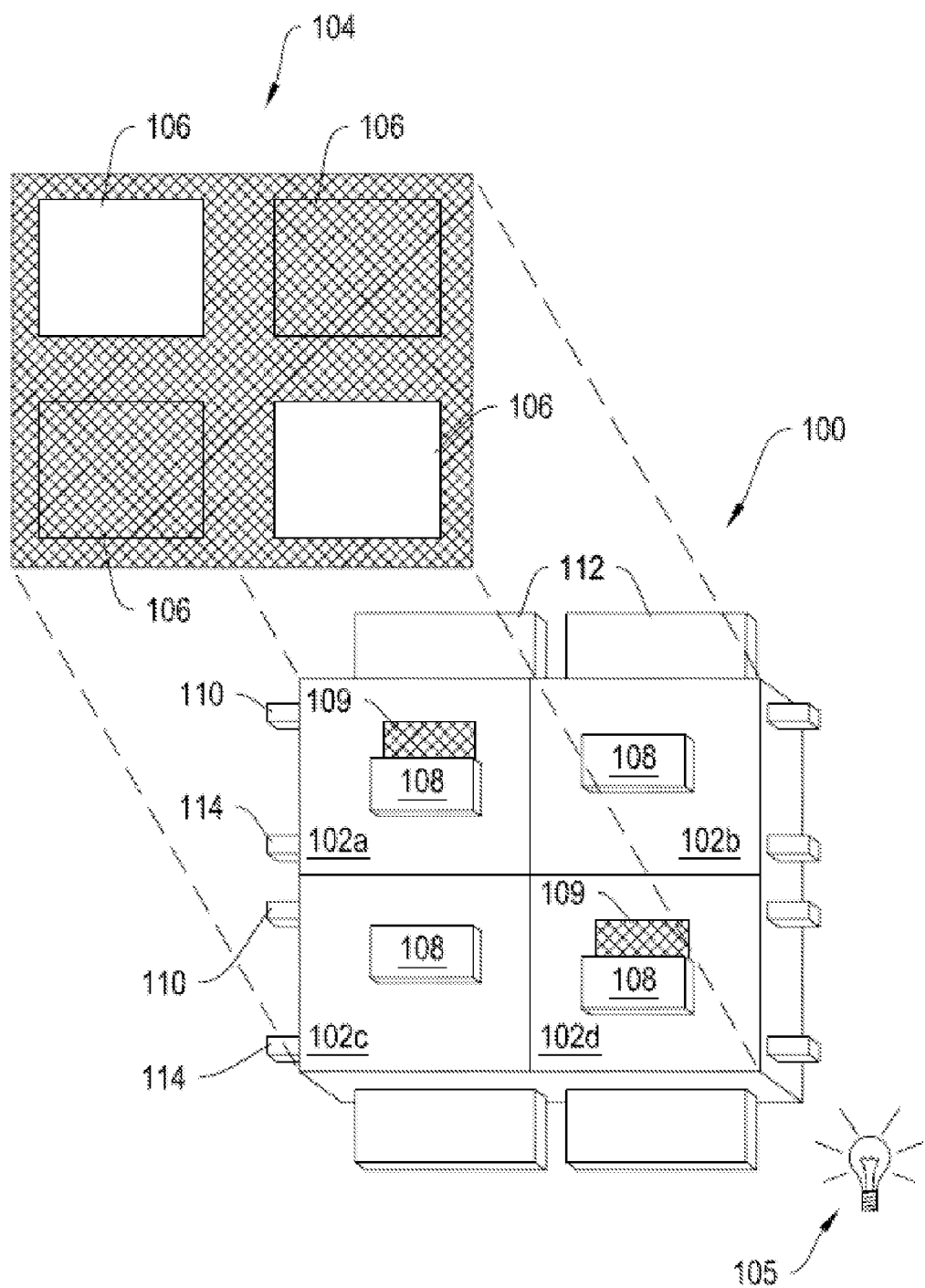
FIG. 1A shows a schematic diagram of an example direct-view microelectromechanical systems (MEMS)-based display apparatus.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that is capable of displaying an image, whether in motion (such as video) or stationary (such as still images), and whether textual, graphical or pictorial. The concepts and examples provided in this disclosure may be applicable to a variety of displays, such as liquid crystal displays (LCDs), organic light-emitting diode (OLED) displays, field emission displays, and electromechanical systems (EMS) and microelectromechanical (MEMS)-based displays, in addition to displays incorporating features from one or more display technologies.

The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

A controller of a display device can obtain an indication of current ambient conditions from an ambient light sensor or from a host device hosting the display device. The controller can monitor ambient light conditions and adjust its operations accordingly. Upon receiving image frame data, the controller can derive a plurality of color subfields and determine a bit-depth value for each derived color subfield based on the obtained indication of current ambient conditions. In particular, the controller can employ data mapping ranges of ambient light levels to respective bit-depth values for the plurality of color subfields. For a given ambient level range, different bit-depth values can be assigned to different color subfields. As such, the bit-depth values can be determined on a color subfield by color subfield basis. The data can include one or more lookup tables (LUTs) stored in a memory component residing in, or otherwise accessible to, the controller. For instance, multiple LUTs associated with different degrees of bit-depth adaptation can be used. The controller can select one LUT from the multiple LUTs based on one or more criteria, such as user preferences, a settings mode, the content of an image to be displayed, or an application running on the host device, and determine the bit-depth values from the selected LUT. The controller can generate a number of image subframes from each derived color subfield corresponding to the respective determined bit-depth value and cause the generated image subframes to be displayed. The controller can adjust the illumination time durations for the generated image subframes based on the total number of generated subframes. In some implementations, the controller also can cause backlight or front light intensity for displaying the generated image subframes to be adjusted based on the ambient light levels.

Particular implementations of the subject matter described in this disclosure can be implemented to realize one or more of the following potential advantages. The image formation apparatus and processes disclosed herein mitigate the effect of high ambient light on viewability of displayed content without overly increasing power consumption. While reducing the number of subframes to be displayed can result in degradation of displayed image quality, the apparatus and processes can provide different levels of adaptations to ambient conditions therefore allowing for balancing between power consumption and displayed image quality based on one or more criteria.

FIG. 1A shows a schematic diagram of an example direct-view MEMS-based display apparatus 100. The display apparatus 100 includes a plurality of light modulators 102a-102d (generally light modulators 102) arranged in rows and columns. In the display apparatus 100, the light modulators 102a and 102d are in the open state, allowing light to pass. The light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e., by use of a front light.

In some implementations, each light modulator 102 corresponds to a pixel 106 in the image 104. In some other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide a luminance level in an image 104. With respect to an image, a pixel corresponds to the smallest picture element defined by the resolution of image. With respect to structural components of the display apparatus 100, the term pixel refers to the combined mechanical and electrical components utilized to modulate the light that forms a single pixel of the image.

The display apparatus 100 is a direct-view display in that it may not include imaging optics typically found in projection applications. In a projection display, the image formed on the surface of the display apparatus is projected onto a screen or onto a wall. The display apparatus is substantially smaller than the projected image. In a direct view display, the image can be seen by looking directly at the display apparatus, which contains the light modulators and optionally a backlight or front light for enhancing brightness or contrast seen on the display.

Direct-view displays may operate in either a transmissive or reflective mode. In a transmissive display, the light modulators filter or selectively block light which originates from a lamp or lamps positioned behind the display. The light from the lamps is optionally injected into a lightguide or backlight so that each pixel can be uniformly illuminated. Transmissive direct-view displays are often built onto transparent substrates to facilitate a sandwich assembly arrangement where one substrate, containing the light modulators, is positioned over the backlight. In some implementations, the transparent substrate can be a glass substrate (sometimes referred to as a glass plate or panel), or a plastic substrate. The glass substrate may be or include, for example, a borosilicate glass, wine glass, fused silica, a soda lime glass, quartz, artificial quartz, Pyrex, or other suitable glass material.

Each light modulator 102 can include a shutter 108 and an aperture 109. To illuminate a pixel 106 in the image 104, the shutter 108 is positioned such that it allows light to pass through the aperture 109. To keep a pixel 106 unlit, the shutter 108 is positioned such that it obstructs the passage of light through the aperture 109. The aperture 109 is defined by an opening patterned through a reflective or light-absorbing material in each light modulator 102.

The display apparatus also includes a control matrix coupled to the substrate and to the light modulators for controlling the movement of the shutters. The control matrix includes a series of electrical interconnects (such as interconnects 110, 112 and 114), including at least one write-enable interconnect 110 (also referred to as a scan line interconnect) per row of pixels, one data interconnect 112 for each column of pixels, and one common interconnect 114 providing a common voltage to all pixels, or at least to pixels from both multiple columns and multiple rows in the display apparatus 100. In response to the application of an appropriate voltage (the write-enabling voltage, $V_{WE}$), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In some other implementations, the data voltage pulses control switches, such as transistors or other non-linear circuit elements that control the application of separate drive voltages, which are typically higher in magnitude than the data voltages, to the light modulators 102. The application of these drive voltages results in the electrostatic driven movement of the shutters 108.

The control matrix also may include, without limitation, circuitry, such as a transistor and a capacitor associated with each shutter assembly. In some implementations, the gate of each transistor can be electrically connected to a scan line interconnect. In some implementations, the source of each transistor can be electrically connected to a corresponding data interconnect. In some implementations, the drain of each transistor may be electrically connected in parallel to an electrode of a corresponding capacitor and to an electrode of a corresponding actuator. In some implementations, the other electrode of the capacitor and the actuator associated with each shutter assembly may be connected to a common or ground potential. In some other implementations, the transistor can be replaced with a semiconducting diode, or a metal-insulator-metal switching element.

Figure 1B:
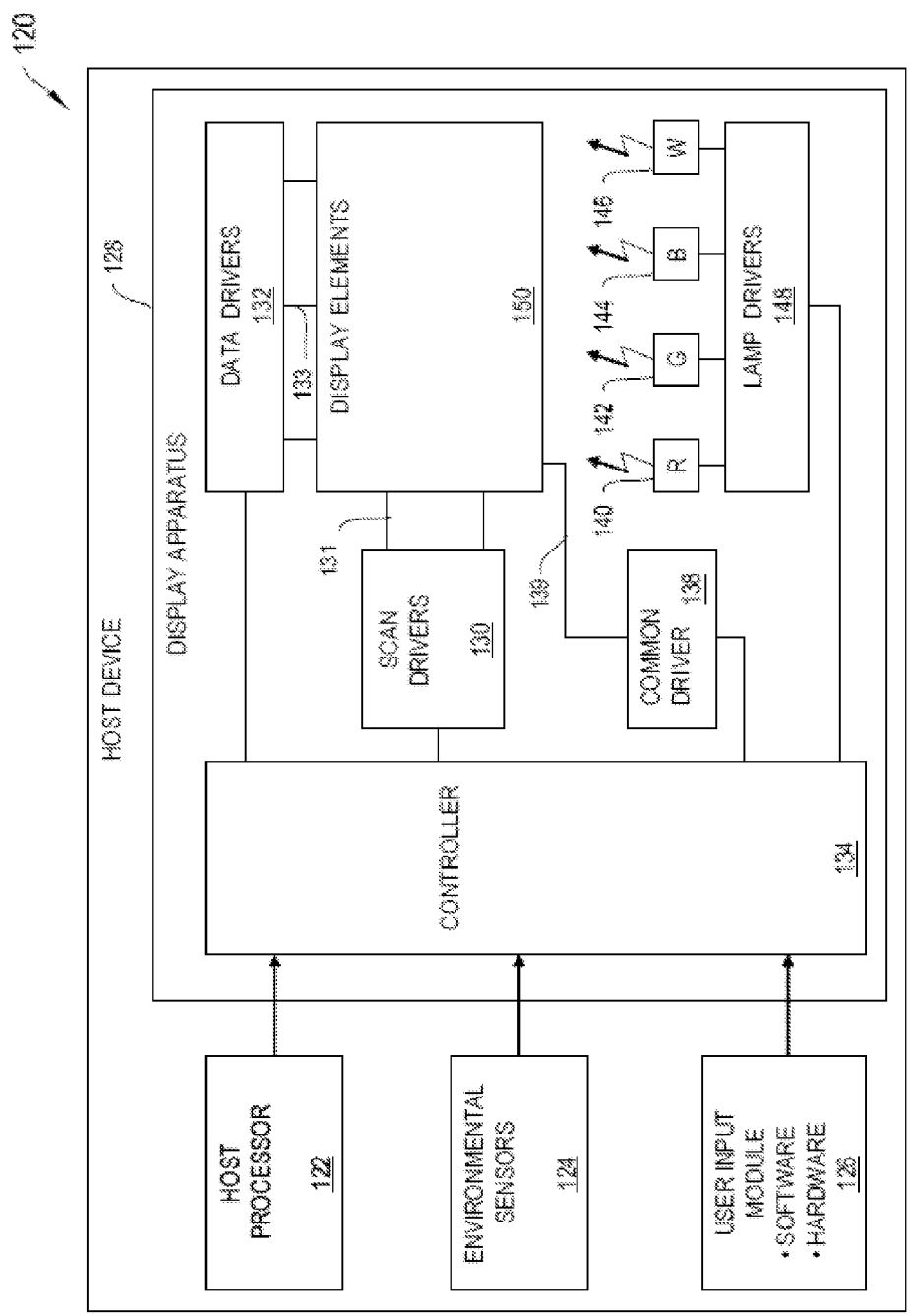
FIG. 1B shows a block diagram of an example host device.

FIG. 1B shows a block diagram of an example host device 120 (i.e., cell phone, smart phone, PDA, MP3 player, tablet, e-reader, netbook, notebook, watch, wearable device, laptop, television, or other electronic device). The host device 120 includes a display apparatus 128 (such as the display apparatus 100 shown in FIG. 1A), a host processor 122, environmental sensors 124, a user input module 126, and a power source.

The display apparatus 128 includes a plurality of scan drivers 130 (also referred to as write enabling voltage sources), a plurality of data drivers 132 (also referred to as data voltage sources), a controller 134, common drivers 138, lamps 140-146, lamp drivers 148 and an array of display elements 150, such as the light modulators 102 shown in FIG. 1A. The scan drivers 130 apply write enabling voltages to scan line interconnects 131. The data drivers 132 apply data voltages to the data interconnects 133.

In some implementations of the display apparatus, the data drivers 132 are capable of providing analog data voltages to the array of display elements 150, especially where the luminance level of the image is to be derived in analog fashion. In analog operation, the display elements are designed such that when a range of intermediate voltages is applied through the data interconnects 133, there results a range of intermediate illumination states or luminance levels in the resulting image. In some other implementations, the data drivers 132 are capable of applying a reduced set, such as 2, 3 or 4, of digital voltage levels to the data interconnects 133. In implementations in which the display elements are shutter-based light modulators, such as the light modulators 102 shown in FIG. 1A, these voltage levels are designed to set, in digital fashion, an open state, a closed state, or other discrete state to each of the shutters 108. In some implementations, the drivers are capable of switching between analog and digital modes.

The scan drivers 130 and the data drivers 132 are connected to a digital controller circuit 134 (also referred to as the controller 134). The controller 134 sends data to the data drivers 132 in a mostly serial fashion, organized in sequences, which in some implementations may be predetermined, grouped by rows and by image frames. The data drivers 132 can include series-to-parallel data converters, level-shifting, and for some applications digital-to-analog voltage converters.

The display apparatus optionally includes a set of common drivers 138, also referred to as common voltage sources. In some implementations, the common drivers 138 provide a DC common potential to all display elements within the array 150 of display elements, for instance by supplying voltage to a series of common interconnects 139. In some other implementations, the common drivers 138, following commands from the controller 134, issue voltage pulses or signals to the array of display elements 150, for instance global actuation pulses which are capable of driving or initiating simultaneous actuation of all display elements in multiple rows and columns of the array.

Each of the drivers (such as scan drivers 130, data drivers 132 and common drivers 138) for different display functions can be time-synchronized by the controller 134. Timing commands from the controller 134 coordinate the illumination of red (R), green (G), blue (B) and white (W) lamps (140, 142, 144 and 146 respectively) via lamp drivers 148, the write-enabling and sequencing of specific rows within the array of display elements 150, the output of voltages from the data drivers 132, and the output of voltages that provide for display element actuation. In some implementations, the lamps are light emitting diodes (LEDs).

The controller 134 determines the sequencing or addressing scheme by which each of the display elements can be re-set to the illumination levels appropriate to a new image 104. New images 104 can be set at periodic intervals. For instance, for video displays, color images or frames of video are refreshed at frequencies ranging from 10 to 300 Hertz (Hz). In some implementations, the setting of an image frame to the array of display elements 150 is synchronized with the illumination of the lamps 140, 142, 144 and 146 such that alternate image frames are illuminated with an alternating series of colors, such as R, G, B and W. The image frames for each respective color are referred to as color subframes. In this method, referred to as the field sequential color method, if the color subframes are alternated at frequencies in excess of 20 Hz, the human visual system (HVS) will average the alternating frame images into the perception of an image having a broad and continuous range of colors. In some other implementations, the lamps can employ primary colors other than R, G, B and W. In some implementations, fewer than four, or more than four lamps with primary colors can be employed in the display apparatus 128.

In some implementations, where the display apparatus 128 is designed for the digital switching of shutters, such as the shutters 108 shown in FIG. 1A, between open and closed states, the controller 134 forms an image by the method of time division gray scale. In some other implementations, the display apparatus 128 can provide gray scale through the use of multiple display elements per pixel.

In some implementations, the data for an image state is loaded by the controller 134 to the array of display elements 150 by a sequential addressing of individual rows, also referred to as scan lines. For each row or scan line in the sequence, the scan driver 130 applies a write-enable voltage to the write enable interconnect 131 for that row of the array of display elements 150, and subsequently the data driver 132 supplies data voltages, corresponding to desired shutter states, for each column in the selected row of the array. This addressing process can repeat until data has been loaded for all rows in the array of display elements 150. In some implementations, the sequence of selected rows for data loading is linear, proceeding from top to bottom in the array of display elements 150. In some other implementations, the sequence of selected rows is pseudo-randomized, in order to mitigate potential visual artifacts. And in some other implementations, the sequencing is organized by blocks, where, for a block, the data for a certain fraction of the image is loaded to the array of display elements 150. For example, the sequence can be implemented to address every fifth row of the array of the display elements 150 in sequence.

In some implementations, the addressing process for loading image data to the array of display elements 150 is separated in time from the process of actuating the display elements. In such an implementation, the array of display elements 150 may include data memory elements for each display element, and the control matrix may include a global actuation interconnect for carrying trigger signals, from the common driver 138, to initiate simultaneous actuation of the display elements according to data stored in the memory elements.

In some implementations, the array of display elements 150 and the control matrix that controls the display elements may be arranged in configurations other than rectangular rows and columns. For example, the display elements can be arranged in hexagonal arrays or curvilinear rows and columns.

The host processor 122 generally controls the operations of the host device 120. For example, the host processor 122 may be a general or special purpose processor for controlling a portable electronic device. With respect to the display apparatus 128, included within the host device 120, the host processor 122 outputs image data as well as additional data about the host device 120. Such information may include data from environmental sensors 124, such as ambient light or temperature; information about the host device 120, including, for example, an operating mode of the host or the amount of power remaining in the host device's power source; information about the content of the image data; information about the type of image data; or instructions for the display apparatus 128 for use in selecting an imaging mode.

In some implementations, the user input module 126 enables the conveyance of personal preferences of a user to the controller 134, either directly, or via the host processor 122. In some implementations, the user input module 126 is controlled by software in which a user inputs personal preferences, for example, color, contrast, power, brightness, content, and other display settings and parameters preferences. In some other implementations, the user input module 126 is controlled by hardware in which a user inputs personal preferences. In some implementations, the user may input these preferences via voice commands, one or more buttons, switches or dials, or with touch-capability. The plurality of data inputs to the controller 134 direct the controller to provide data to the various drivers 130, 132, 138 and 148 which correspond to optimal imaging characteristics.

The environmental sensor module 124 also can be included as part of the host device 120. The environmental sensor module 124 can be capable of receiving data about the ambient environment, such as temperature and or ambient lighting conditions. The sensor module 124 can be programmed, for example, to distinguish whether the device is operating in an indoor or office environment versus an outdoor environment in bright daylight versus an outdoor environment at nighttime. The sensor module 124 communicates this information to the display controller 134, so that the controller 134 can optimize the viewing conditions in response to the ambient environment.

Figure 2A:
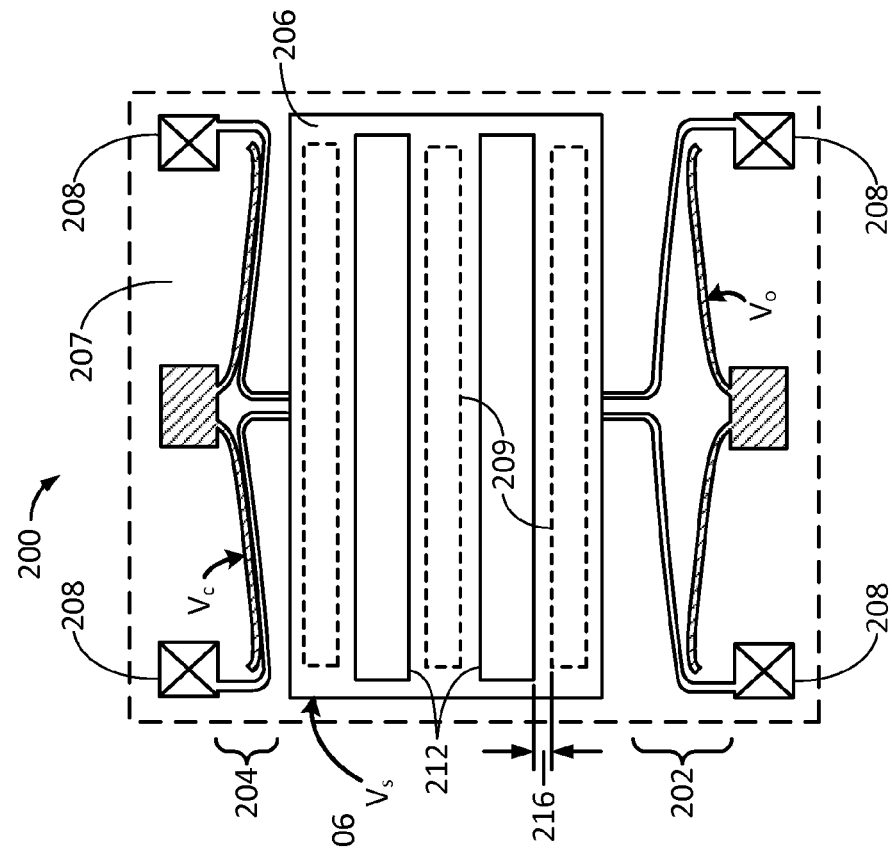
FIGS. 2A and 2B show views of an example dual actuator shutter assembly.
Figure 2B:
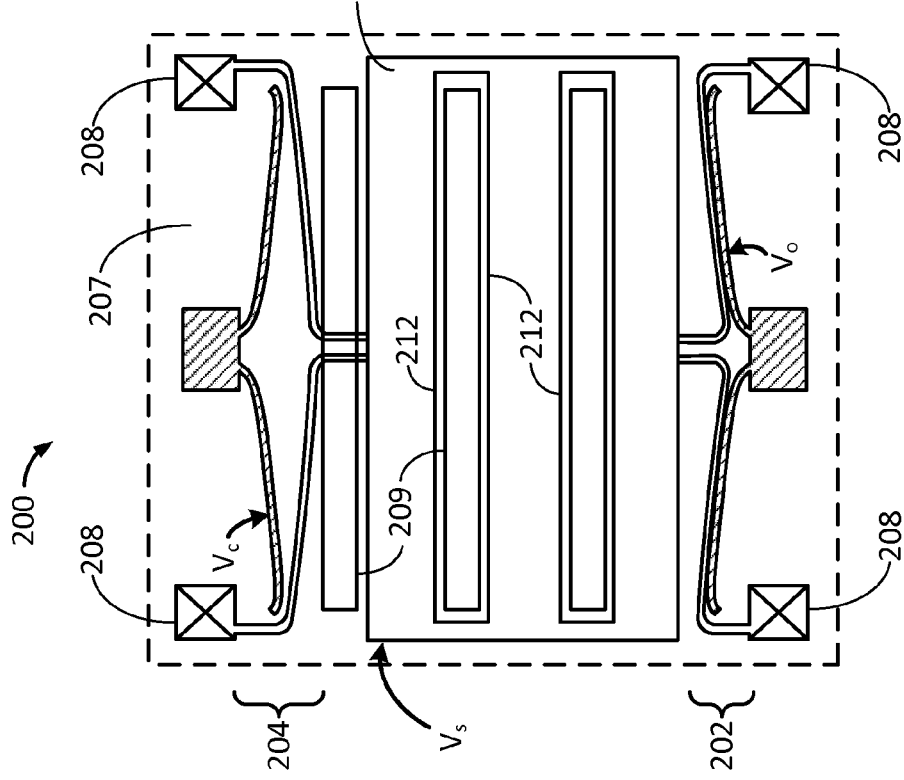

FIGS. 2A and 2B show views of an example dual actuator shutter assembly 200. The dual actuator shutter assembly 200, as depicted in FIG. 2A, is in an open state. FIG. 2B shows the dual actuator shutter assembly 200 in a closed state. The shutter assembly 200 includes actuators 202 and 204 on either side of a shutter 206. Each actuator 202 and 204 is independently controlled. A first actuator, a shutter-open actuator 202, serves to open the shutter 206. A second opposing actuator, the shutter-close actuator 204, serves to close the shutter 206. Each of the actuators 202 and 204 can be implemented as compliant beam electrode actuators. The actuators 202 and 204 open and close the shutter 206 by driving the shutter 206 substantially in a plane parallel to an aperture layer 207 over which the shutter is suspended. The shutter 206 is suspended a short distance over the aperture layer 207 by anchors 208 attached to the actuators 202 and 204. Having the actuators 202 and 204 attach to opposing ends of the shutter 206 along its axis of movement reduces out of plane motion of the shutter 206 and confines the motion substantially to a plane parallel to the substrate (not depicted).

In the depicted implementation, the shutter 206 includes two shutter apertures 212 through which light can pass. The aperture layer 207 includes a set of three apertures 209. In FIG. 2A, the shutter assembly 200 is in the open state and, as such, the shutter-open actuator 202 has been actuated, the shutter-close actuator 204 is in its relaxed position, and the centerlines of the shutter apertures 212 coincide with the centerlines of two of the aperture layer apertures 209. In FIG. 2B, the shutter assembly 200 has been moved to the closed state and, as such, the shutter-open actuator 202 is in its relaxed position, the shutter-close actuator 204 has been actuated, and the light blocking portions of the shutter 206 are now in position to block transmission of light through the apertures 209 (depicted as dotted lines).

Each aperture has at least one edge around its periphery. For example, the rectangular apertures 209 have four edges. In some implementations, in which circular, elliptical, oval, or other curved apertures are formed in the aperture layer 207, each aperture may have a single edge. In some other implementations, the apertures need not be separated or disjointed in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through the apertures 212 and 209 in the open state, the width or size of the shutter apertures 212 can be designed to be larger than a corresponding width or size of apertures 209 in the aperture layer 207. In order to effectively block light from escaping in the closed state, the light blocking portions of the shutter 206 can be designed to overlap the edges of the apertures 209. FIG. 2B shows an overlap 216, which in some implementations can be predefined, between the edge of light blocking portions in the shutter 206 and one edge of the aperture 209 formed in the aperture layer 207.

The electrostatic actuators 202 and 204 are designed so that their voltage-displacement behavior provides a bi-stable characteristic to the shutter assembly 200. For each of the shutter-open and shutter-close actuators, there exists a range of voltages below the actuation voltage, which if applied while that actuator is in the closed state (with the shutter being either open or closed), will hold the actuator closed and the shutter in position, even after a drive voltage is applied to the opposing actuator. The minimum voltage needed to maintain a shutter's position against such an opposing force is referred to as a maintenance voltage $V_m$.

Figure 3:
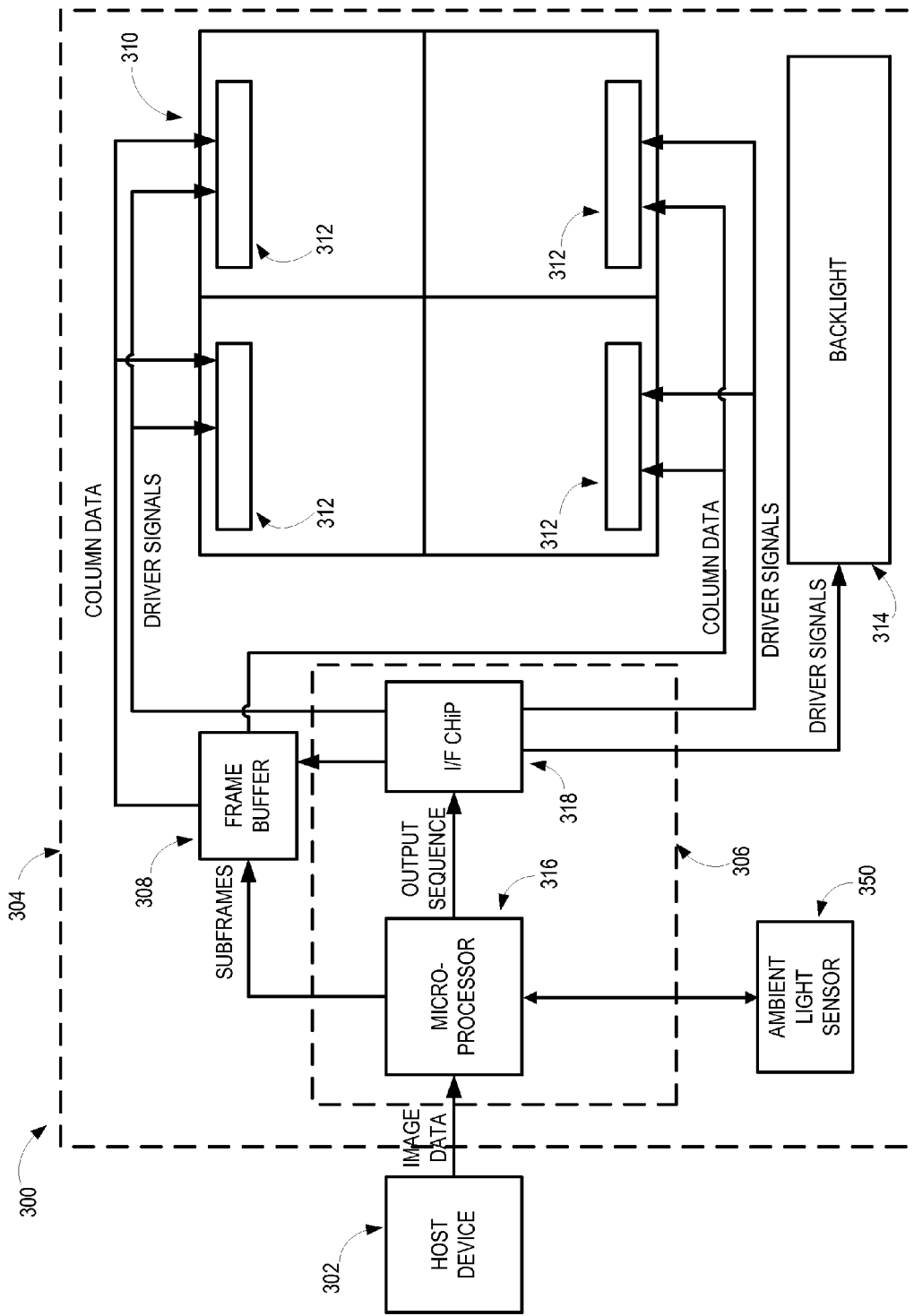
FIG. 3 shows a block diagram of an example display apparatus.

FIG. 3 shows a block diagram of an example display apparatus 300. The display apparatus 300 includes a host device 302 and a display module 304. The host device can be any of a number of electronic devices, such as a portable telephone, a smartphone, a watch, a tablet computer, a laptop computer, a desktop computer, a television, a set top box, a DVD or other media player, or any other device that provides graphical output to a display. In general, the host device 302 serves as a source for image data to be displayed on the display module 304.

The display module 304 further includes control logic 306, a frame buffer 308, an array of display elements 310, display drivers 312 a backlight 314, and an ambient light sensor 350. In some implementations, the ambient light sensor can reside in the host device 302. The ambient light sensor can be utilized to measure ambient light levels and report the measured ambient light level to the control logic 306, the host device 302 or to both. In general, the control logic 306 serves to process image data received from the host device 302 and controls the display drivers 312, array of display elements 310 and backlight 314 to together produce the images encoded in the image data. The functionality of the control logic 306 is described further below in relation to FIGS. 4 and 5.

In some implementations, as shown in FIG. 3, the functionality of the control logic 306 is divided between a microprocessor 316 and an interface (I/F) chip 318. In some implementations, the interface chip 318 is implemented in an integrated circuit logic device, such as an application specific integrated circuit (ASIC). In some implementations, the microprocessor 316 is configured to carry out all or substantially all of the image processing functionality of the control logic 306. In addition, the microprocessor 316 can be configured to determine an appropriate output sequence for the display module 304 to use to generate received images. For example, the microprocessor 316 can be configured to convert image frames included in the received image data into a set of image subframes, for instance bitplanes. Each image subframe can be associated with a color and a weight, and includes desired states of each of the display elements in the array of display elements 310. The control logic can be configured to determine the number of image subframes to display to produce a given image frame. The microprocessor 316 also can be configured to determine the order in which the image subframes are to be displayed and parameters associated with implementing the appropriate weight for each of the image subframes. These parameters may include, in various implementations, the duration for which each of the respective image subframes is to be illuminated and the intensity of such illumination. These parameters (i.e., the number of subframes, the order and timing of their output, and their weight implementation parameters for each subframe) can be collectively referred to as an "output sequence."

In some implementations, the control logic 306 can be configured to obtain an indication of an ambient light level from the ambient light sensor 350, the host device 302 or from both and adjust a number of image subframes used to display an image frame. In response to receiving image data associated with a respective image frame, the control logic 306 can determine a separate bit-depth value for each color subfield associated with the image frame based on the obtained indication of ambient light level. The control logic 306 can be configured to employ data mapping ranges of ambient light levels to separate bit-depth values for each color subfield of a plurality of color subfields and determine the bit-depth values based on the employed data. The determined bit-depth value for each color subfield represents the number of image subframes to be generated for that color subfield. The control logic 306 can be configured to generate a number of image subframes for each color subfield equal to the respective determined bit-depth value. Based on the total number of generated image subframes, the control logic 306 can adjust the illumination time durations for the generated image subframes. The control logic 306 can then cause the generated subframes to be displayed according to the respective adjusted illumination time durations. In some implementations, the control logic 306 can further adjust backlight or frontlight intensity for displaying the generated image subframes.

The interface chip 318 can be configured to carry out more routine operations of the display module 304. The operations may include retrieving image subframes from the frame buffer 308 and outputting control signals to the display drivers 312 and the backlight 314 in response to the retrieved image subframe and the output sequence determined by the microprocessor 316. The frame buffer 308 can be any volatile or non-volatile integrated circuit memory, such as DRAM, high-speed cache memory, or flash memory (for example, the frame buffer 308 can be similar to the frame buffer 28 shown in FIG. 7B). In some other implementations, the interface chip 318 causes the frame buffer 308 to output data signals directly to the display drivers 312.

In some other implementations, the functionality of the microprocessor 316 and the interface chip 318 are combined into a single logic device, which may take the form of a microprocessor, an ASIC, a field programmable gate array (FPGA) or other programmable logic device. For example, the functionality of the microprocessor 316 and the interface chip 318 can be implemented by a processor 21 shown in FIG. 7B. In some other implementations, the functionality of the microprocessor 316 and the interface chip 318 may be divided in other ways between multiple logic devices, including one or more microprocessors, ASICs, FPGAs, digital signal processors (DSPs) or other logic devices.

The array of display elements 310 can include an array of any type of display elements that can be used for image formation. In some implementations, the display elements can be EMS light modulators. In some such implementations, the display elements can be MEMS shutter-based light modulators similar to those shown in FIG. 2A or 2B. In some other implementations, the display elements can be other forms of light modulators, including liquid crystal light modulators, other types of EMS based light modulators, or light emitters, such as OLED emitters, configured for use with a time division gray scale image formation process.

The display drivers 312 can include a variety of drivers depending on the specific control matrix used to control the display elements in the array of display elements 310. In some implementations, the display drivers 312 include a plurality of scan drivers similar to the scan drivers 130, a plurality of data drivers similar to the data drivers 132, and a set of common drivers similar to the common drivers 138, all shown in FIG. 1B. As described above, the scan drivers output write enabling voltages to rows of display elements, while the data drivers output data signals along columns of display elements. The common drivers output signals to display elements in multiple rows and multiple columns of display elements.

In some implementations, particularly for larger display modules 304, the control matrix used to control the display elements in the array of display elements 310 is segmented into multiple regions. For example, the array of display elements 310 shown in FIG. 3 is segmented into four quadrants. A separate set of display drivers 312 is coupled to each quadrant. Dividing a display into segments in this fashion reduces the propagation time needed for signals output by the display drivers to reach the furthest display element coupled to a given driver, thereby decreasing the time needed to address the display. Such segmentation also can reduce the power requirements of the drivers employed. It also can allow for separate variation of actuation voltages applied to display elements, for example, to separately counter fluid pressure variation-based forces experienced in each quadrant resulting from opposing motion events occurring in those quadrants.

In some implementations, the display elements in the array of display elements can be utilized in a direct-view transmissive display. In direct-view transmissive displays, the display elements, such as EMS light modulators, selectively block light that originates from a backlight, which is illuminated by one or more lamps. Such display elements can be fabricated on transparent substrates, made, for example, from glass. In some implementations, the display drivers 312 are coupled directly to the glass substrate on which the display elements are formed. In such implementations, the drivers are built using a chip-on-glass configuration. In some other implementations, the drivers are built on a separate circuit board and the outputs of the drivers are coupled to the substrate using, for example, flex cables or other wiring.

The backlight 314 can include a light guide, one or more light sources (such as LEDs), and light source drivers. The light sources can include light sources of multiple primary colors, such as red (R)), green (G), blue (B), and in some implementations white (W). The light source drivers are configured to individually drive the light sources to a plurality of discrete light levels to enable illumination gray scale or content adaptive backlight control (CABC) in the backlight. The light guide distributes the light output by light sources substantially evenly beneath the array of display elements 310. In some other implementations, for example for displays including reflective display elements, the display apparatus 300 can include a front light or other form of lighting instead of a backlight. The illumination of such alternative light sources can likewise be controlled according to illumination grayscale processes that incorporate content adaptive control features. For ease of explanation, the display processes discussed herein are described with respect to the use of a backlight. However, it would be understood by a person of ordinary skill that such processes also may be adapted for use with a front light or other similar form of display lighting.

Figure 4:
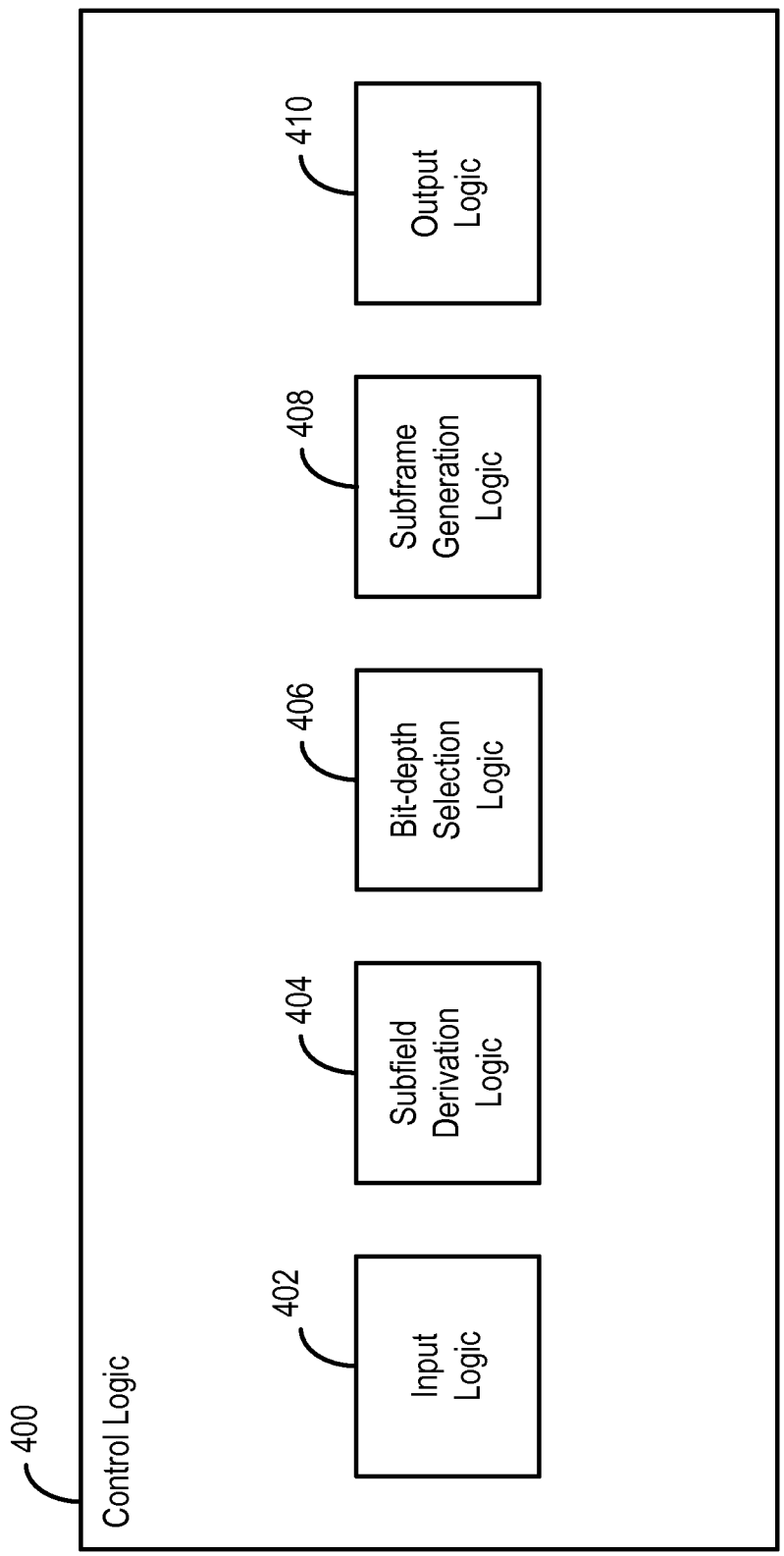
FIG. 4 shows a block diagram of example control logic suitable for use in the display apparatus shown in FIG. 3.

FIG. 4 shows a block diagram of example control logic 400 suitable for use as, for example, the control logic 306 in the display apparatus 300 shown in FIG. 3. More particularly, FIG. 4 shows a block diagram of functional modules, which, in some implementations, are executed by the microprocessor 316. Each functional module can be implemented as software in the form of computer executable instructions stored on a tangible computer readable medium, which can be executed by the microprocessor 316. In some implementations, one or more of the functional modules (or portions thereof) is implemented in integrated circuit logic, such as ASIC or FPGA. The control logic 400 includes input logic 402, subfield derivation logic 404, bit-depth selection logic 406, subframe generation logic 408, and output logic 410. While shown as separate functional modules in FIG. 4, in some implementations, the functionality of two or more of the modules may be combined into one or more larger, more comprehensive modules or broken down into smaller more discrete modules.

The input logic 402 is configured to receive input image data as a stream of pixel intensity values, and present the pixel intensity values to other modules within the control logic 400. The subfield derivation logic 404 can derive color subfields (such as red (R), green (G), blue (B), white (W), yellow (Y), cyan (C), magenta (M) or any other color in the color gamut of the display module 304) based on the pixel intensity values. The bit-depth selection logic 406 can determine a separate bit-depth value for each of the color subfields based on an indication of ambient light level. The subframe generation logic 408 can generate subframes for each of the color subfields based on the respective bit-depth value, the output sequence and the pixel intensity values. The output logic 410 can coordinate with one or more of the other logic components to determine an appropriate output sequence, and then use the output sequence to display the subframes on the display.

The bit-depth selection logic 406 is configured to take an indication of an ambient light level as input and provide bit-depth values for a plurality of color subfields as output. In some implementations, the bit-depth selection logic 406 can be implemented as integrated circuit logic. In some implementations, data mapping ranges of ambient light levels to separate bit-depth values for each color subfield can be embedded within the integrated circuit logic. In some implementations, the bit-depth values can be stored within memory buffers of the integrated circuit logic. The mapping between the ranges of ambient light levels and respective bit-depth values can be implemented using one or more comparators or other logic operators. In some implementations, the bit-depth selection logic 406 can be implemented as software including computer readable instructions executable by the microprocessor 316 (shown in FIG. 3). The data mapping ranges of ambient light levels to separate bit-depth values for each component color subfield can be stored in a cache memory of the microprocessor 316 or in any memory component associated with the control logic 306.

In some implementations, the data mapping ranges of ambient light levels to separate bit-depth values for each color subfield includes a single lookup table (LUT). In some implementations, the data mapping ranges of ambient light levels to separate bit-depth values for each color subfield includes multiple LUTs and the control logic 306 is configured to select an LUT from the multiple LUTs for use in determining the bit-depth values for the plurality of color subfields. In some implementations, each LUT is associated with a level of bit-depth adaptation. The level of bit-depth adaptation can relate to the aggressiveness with which bit-depths are reduced based on ambient light conditions varies from one LUT to another. In some implementations, the data mapping ranges of ambient light levels to separate bit-depth values for each color subfield can be implemented using other data structures (other than tables) such as trees, linked lists, other data structures, or combinations thereof.

Figure 5:
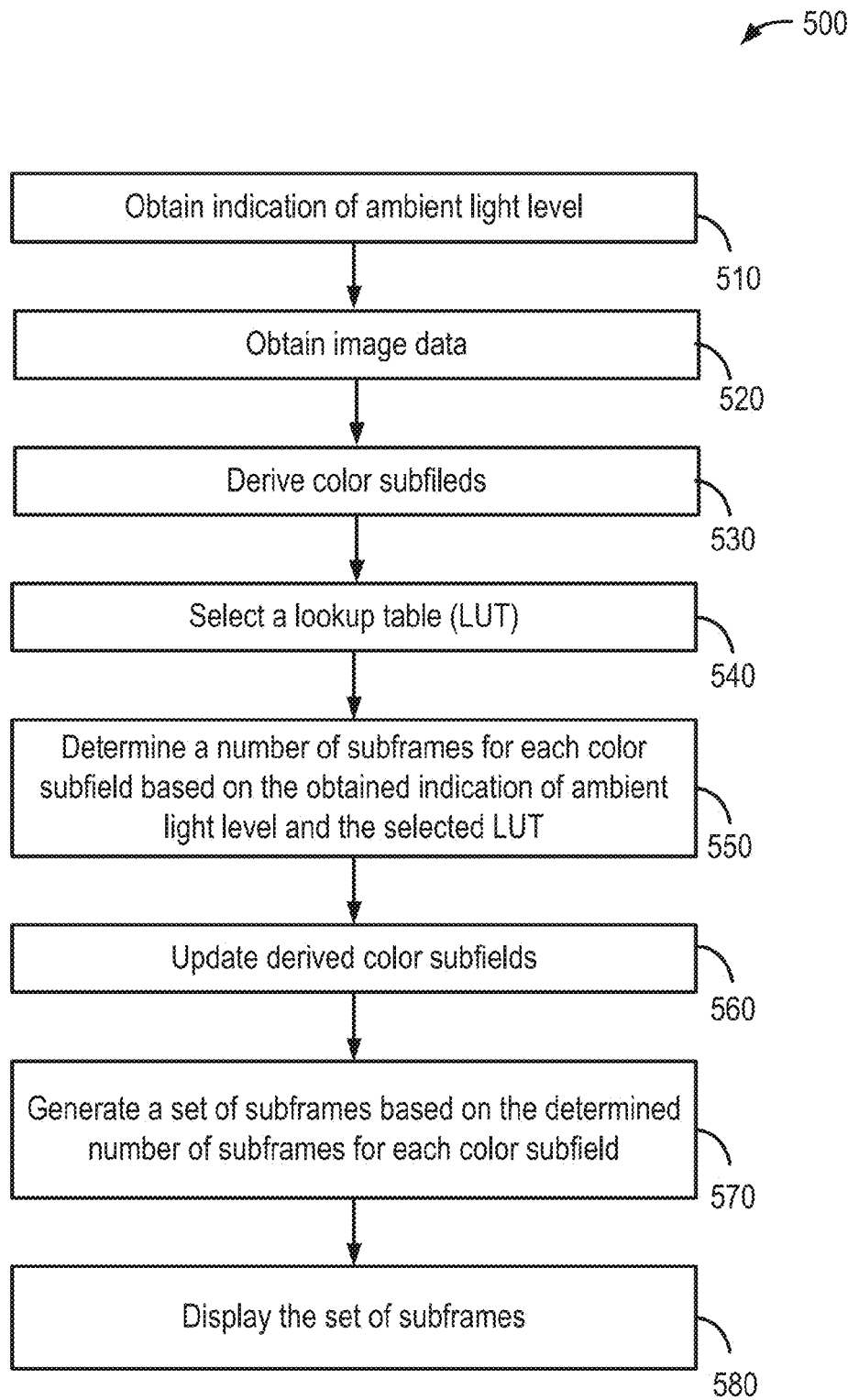
FIG. 5 shows a flow diagram of an example process of displaying an image frame.

In some implementations, when executed by the microprocessor 316, the components of the control logic 400, along with the interface chip 318, display drivers 312, and backlight 314 (such as those shown in FIG. 3), function to carry out a method for generating an image on a display, such as the process 500 shown in FIG. 5. The functionality of the components of the control logic 400 is described further in relation to various operations carried out as part of the process 500.

In some implementations, the control logic 400 can determine and cause display of a number of image subframes for generating an image based on an indication of ambient light level. Implementations of processes for determining and displaying a number of image subframes for each color subfield associated with an image frame are described with respect to FIGS. 3, 4 and 5.

FIG. 5 shows a flow diagram of an example process 500 of displaying an image frame. In some implementations, the process 500 can be carried out by the control logic 400 (shown in FIG. 4). In some implementations, the process 500 includes obtaining an indication of ambient light level (stage 510), obtaining image data associated with an image frame (stage 520), deriving a plurality of color subfields (stage 530), selecting a lookup (LUT) table (stage 540), determining a bit-depth value for each color subfield based on the obtained indication of ambient light level and the selected LUT (stage 550), updating the derived color subfields (stage 560), generating a set of image subframes for each updated color subfield based on the respective bit-depth value (stage 570), and causing the generated image subframes to be displayed (stage 580).

Referring to FIGS. 3, 4 and 5, the process 500 includes obtaining an indication of ambient light level (stage 510). The indication can be obtained by the bit-depth selection logic 406 from the ambient light sensor 350, the host device 302 or from both. In some implementations, the ambient light sensor 350 can detect an ambient light level and report the detected ambient light level to the bit-depth-selection logic 406. In some implementations, the ambient light sensor 350 can report indications of detected ambient light levels periodically. In some implementations, the ambient light sensor 350 can report an indication of ambient light level upon detecting a substantial change in ambient conditions. In some implementations, the ambient light sensor 350 can be configured to report indications of ambient light levels to the bit-depth selection logic 406 when the display device 304 or the host device 302 is operating in a given settings mode. The bit-depth selection logic 406 can be configured to store and use an obtained indication of the ambient light level until a new indication is obtained. In some implementations, the indication of ambient light level includes an ambient light level value or an indication of a range of ambient light levels. In some implementations, the indication of ambient light level includes an indication of an ambient condition mode such as "outdoor," "indoor," "bright," "normal," "dim," the like, or combinations thereof. In some implementations, the ambient condition modes can be provided to a user operating the host device 302 (for instance within settings' options) to select from. Upon the user's selection, an indication of the selection can be reported to the bit-depth selection logic 406. In some implementations, the ambient light sensor 350 can be configured to select an ambient condition mode based on a detected ambient light level and send an indication of the selected mode to the bit-depth selection logic 406.

The process 500 includes obtaining image data associated with an image frame (stage 520). The image data can be obtained by the input logic 402. Typically, such image data is obtained by the input logic 402 as a stream of intensity values for the R, G, and B components of each pixel in the image frame. The intensity values are typically received as binary numbers. The image data may be received directly from an image source, such as from an electronic storage medium incorporated into the display apparatus 300. Alternatively, it may be received from a host device 302 in which the display apparatus 300 is built.

The subfield derivation logic 404 can be configured to derive a set of color subfields for displaying the image frame (stage 530). In some implementations, the derived color subfields can include frame component colors (also referred to as primary colors) such as the colors R, G, or B. The component colors can be selected independently of the image content or data associated with the image frame. In some implementations, the subfield derivation logic 404 may select an additional subfield color whose color is a composite of at least two colors associated with at least two of the other color subfields. The composite color can be selected based on the contents of the image frame to be displayed or one or more prior image frames. For example, the subfield generation logic 504 can select colors such as, but not limited to, white, yellow, cyan, magenta, or any other color within the display's color gamut, as the composite color. In some implementations, a composite color can be selected independently of the content of the image frame.

In some implementations, deriving the set of color subfields can include preprocessing the obtained image frame. For example, in some implementations, the image data includes color intensity values for more pixels or fewer pixels than are included in the display apparatus 300. In such cases, the input logic 402, the subfield derivation logic 404, or other logic incorporated into the control logic 400 can scale the image data appropriately to the number of pixels included in the display apparatus 300. In some implementations, the image frame data is received having been encoded assuming a given display gamma. In some implementations, if such gamma encoding is detected, logic within the control logic 400 applies a gamma correction process to adjust the pixel intensity values to be more appropriate for the gamma of the display apparatus 300. For example, image data is often encoded based on the gamma of a typical liquid crystal (LCD) display. To address this common gamma encoding, the control logic 400 may store a gamma correction lookup table (LUT) from which it can quickly retrieve appropriate intensity values given a set of LCD gamma encoded pixel values. In some implementations, the gamma correction LUT includes corresponding RGB intensity values having a 16 bit-per-color resolution, though other color resolutions may be used in other implementations.

In some implementations, the image frame preprocessing includes a dithering stage. In some implementations, the process of de-gamma encoding an image results in 16 bit-per-color pixel values, even though the display apparatus 300 may not be configured for displaying such a large number of bits per color. A dithering process can help distribute any quantization error associated with converting these pixel values down to a color resolution available to the display, such as 4, 5, 6, or 8 bits per color.

Once the color subfields are selected, the subfield generation logic 404 can generate initial pixel intensity values for each selected subfield color for all pixels. For example, the subfield generation logic 404 can adjust the pixel intensity values for the R, G, and B subfield colors based on the pixel intensity values selected for the x-channel. For example, if the selected x-channel color is white, then the subfield generation logic 404 can select a pixel intensity value that can be equally subtracted from each of the R, G, and B color pixel intensity values and assign that value as the x-channel pixel intensity value. For example, if the pixel intensity values for a pixel are: R=100, G=200, and B=155, the subfield generation logic 404 can subtract 100 from the pixel intensity values for each color and assign 100 as the pixel intensity value for the x-channel. The resultant adjusted pixel intensity values for the R, G, and B colors would be 0, 100, and 55, respectively. In some implementations, the subfield generation logic 404 can subtract a fraction of the highest pixel intensity value that can be equally subtracted from each of the R, G, and B pixel intensity values. For example, continuing the above example, the subfield generation logic 404 can subtract 50 from the pixel intensity values of each color (0.5 times the highest possible value), resulting in pixel intensity values of R=50, G=150, B=105, and white=50.

The bit-depth selection logic 406 can select a bit-depth look-up table (LUT) from multiple bit-depth LUTs based on one or more criteria for use in determining a bit-depth value for each of the derived color subfields (stage 540). A bit-depth LUT represents a mapping between ambient light level ranges and respective bit-depth values for the color subfields. For a given ambient light level range, a separate bit-depth value is associated with each color subfield. In some implementations, the selection of a bit-depth LUT can be based on one or more criteria such as a battery level of the display device 300 or the host device 302, an application running on the host device 302, an indication of central processing unit (CPU) performance at the host device 302, user preferences, user mode, the like, or combinations thereof. In some implementations, a single bit-depth LUT is employed by the control logic 400. In such implementations, the process 500 does not include the bit-depth LUT selection stage (stage 540).

The bit-depth selection logic 406 can determine a bit-depth value, or a number of image subframes, for each color subfield based on the obtained indication of ambient light level and the selected bit-depth LUT (stage 550). In particular, the bit-depth selection logic 406 can map the obtained indication of ambient light level to a respective range of ambient light levels in the selected bit-depth LUT. The bit-depth selection logic 406 can then use the bit-depth value associated with each color subfield for the respective range of ambient light levels in the bit-depth LUT as the number of image subframes to be generated for that color subfield. The stages 540 and 550 of the process 500 are discussed further in relation to FIG. 6.

FIG. 6 shows two example bit-depth look-up tables (LUTs) 610 and 620. In some implementations, both of the bit-depth LUTs 610 and 620 include five columns. The first column in the bit-depth LUTs 610 and 620 includes multiple ambient light level ranges each corresponding to a respective numerical interval of ambient light level values (in lux). The second column includes for each ambient light level range a bit-depth value associated with the R component color subfield. The third column includes for each ambient light level range a bit-depth value associated with the G component color subfield. The fourth column includes for each ambient light level range a bit-depth value associated with the B component color subfield. A component color subfield as referred to herein can be a color subfield associated with a primary color such as R, G, or B. The fifth column includes for each ambient light level range a bit-depth value associated with the composite color subfield (also referred to herein as x-channel). As illustrated in the tables 610 and 620, the bit-depth values associated with the color subfields for a given ambient light range can be different from one color subfield to another. For instance, in the third row of the table 610 corresponding to the ambient light level range 1000-9999 lux, the color subfields R, G, B, and x-channel are assigned the bit-depth values 6, 7, 5, and 4, respectively.

In some implementations, the bit-depth values associated with each component color subfield across the ambient light level ranges depend on the relative luminance coefficients associated with distinct colors such as R, G, or B. For instance, for some color gamuts, the relative luminance coefficients associated with R, G, and B colors are, respectively, 0.2126, 0.7152 and 0.0722. According to the bit-depth LUTs 610 and 620, the reduction in bit-depth values in response to an increase in ambient light level is more aggressive in the B color subfield (associated with the smallest relative luminance coefficient) than the R or G color subfields. Also, the reduction in bit-depth values in response to an increase in ambient light level is more aggressive in the R color subfield (associated with the second smallest relative luminance coefficient) than the G color subfield. Typically, the smaller the relative luminance coefficient of a given color subfield, the less sensitive the human visual system (HVS) is to a reduction in the bit-depth values associated with that color subfield. If weights are assigned to the color subfields, for example as a result of a content adaptive backlight control (CABC), the same weights can be applied to the respective relative luminance coefficients and the weighted relative luminance coefficients can then be used in generating the bit-depth LUTs.

In some implementations, the mapping between ambient light ranges and respective bit-depth values for the multiple component color subfields depends on characteristics of light sources associated with at least some of the component color subfields. For instance, the response of distinct color LEDs to changes in input current in terms of output light intensity can be different from one color LED to another. For R LEDs such response is typically more linear than that for G or B LEDs. As such, more power consumption reduction can be achieved by reducing the duty cycle of an R LED and assigning the reduced time (from the duty cycle of the R LED) to duty cycle(s) of G or B LED(s). In some implementations of the bit-depth LUTs, the reduction in bit-depth values in response to an increase in ambient light level is more significant in the R color subfield than other color subfields.

In some implementations, the mapping between ambient light ranges and respective bit-depth values for the multiple color subfields depends on the color and brightness of the x-channel. For instance, more aggressive reduction in bit-depth levels can be employed for the R, G and B color subfields when the x-channel is white than when the x-channel is relatively dim.

Comparing similar rows of bit-depth values in the tables 610 and 620, one can see that the table 620 represents a more aggressive bit-depth adaptation to ambient light levels then the table 610. That is, the table 620 illustrates higher reduction in bit-depth values in response to high ambient light levels than the table 610 does. For instance, comparing the second rows in both tables 610 and 620, the bit-depth values associated with the R and B color subfields for the ambient light level range 100-999 lux in the LUT 620 are smaller than the respective bit-depth values (associated with the R and G color subfields for the ambient light level range 100-999 lux) in the bit-depth LUT 610. Also, the bit-depth values associated with the R, G and B color subfields in the third and fourth rows are smaller in the bit-depth LUT 620 than the respective bit-depth values in the bit-depth LUT 610.

In some implementations, the values in the bit-depth LUTs can be selected to correspond to different levels of bit-depth adaptation to implement in response to changes in ambient conditions. For example, different bit-depth LUTs may be appropriate for different types of applications that can run on the host device 302 (shown in FIG. 3). For instance, for text applications, more aggressive bit-depth adaptation may be desirable than for video or photographic image applications. In some implementations, different LUTs may be used based on image frame color content, different user modes, settings modes, or battery levels of the host device 302. For instance, more aggressive reduction in bit-depth values can be employed when the battery of the display device 300 (shown in FIG. 3) is running relatively low on charge. Also, more aggressive reduction in bit-depth values can be employed when the user mode of the host device 302 is indicative of a low power mode. However, less aggressive reduction in bit-depth values can be employed when user preferences indicate a high color fidelity preference. At the stage 540 of the process 500 (shown in FIG. 5), the bit-depth selection logic 406 can obtain one or more indications of user mode, user preferences, battery level, applications type, the like, or combinations thereof from the host device 302 and select a bit-depth LUT based on the obtained indication(s). In some implementations, the aggressiveness in reducing the bit-depth level can depend on the color composition of the image frame. For instance, in an image frame having dominantly R color, more aggressive bit-depth reduction can be applied to the G or B subfield colors.

In some implementations, the bit-depth LUT selection depends on the color and brightness of the composite color. For instance, more aggressive reduction in bit-depth levels can be employed for the R, G, and B component color subfields when the composite color is white than when the composite color is a more saturated color. Accordingly, the bit-depth selection logic 406 (shown in FIG. 4) can select an LUT from multiple LUTs based on the x-channel used to display the image frame.

Considering the bit-depth LUTs 610 and 620, the bit-depth selection logic 406 (shown in FIG. 4) identifies an entry in the selected bit-depth LUT 610 or 620 corresponding to the obtained indication of ambient light level (stage 550 of the process 500 in FIG. 5). The bit-depth selection logic 406 can then use the bit depth value associated with each color subfield for the determined range as the number of image subframes to be generated for that color subfield. For instance, if the bit-depth LUT 610 is selected at stage 540 of the process 500 and the obtained indication of ambient light level is mapped to the range 1000-9999 lux shown in the third row of the bit-depth LUT 610, the number of subframes to be generated for the color subfields R, G, B and the x-channel are, respectively, 6, 7, 5 and 4.

A person of ordinary skill in the art should appreciate that the bit-depth LUTs can be implemented in many other different ways than the implementation shown in FIG. 6. In some implementations, an ambient light range can refer to a numerical interval of ambient level values (for instance in lumens per square meter (Lux)). In some implementations, an ambient level range can refer to an ambient condition such as "outdoor," "indoor," "dim," "normal," "bright," the like, or combinations thereof. The number of bit-depth LUTs employed by the bit-depth selection logic 406 (shown in FIG. 4) can be any integer greater than zero. The number of color subfields can be fewer than or larger than four. Also, the number of ranges of ambient levels may be fewer than or larger than four. In some implementations, the mappings between ranges of ambient light levels and the respective bit-depth values associated with each color subfield can be implemented using one or more trees, linked lists, or any other data structures. In some implementations, the mappings between ranges of ambient light levels and the respective bit-depth values associated with each color subfield can be implemented using an integrated circuit that generates a set of bit-depth values associated with a respective set of color subfields in response to an input value indicative of an ambient light level, ambient level range, or ambient condition.

Referring back to FIGS. 3, 4, 5 and 6, the subframe generation logic 408, the subfield derivation logic 404, or any other logic components of the control logic 400 can update the derived color subfields (stage 560). When the bit-depth values determined at stage 550 are less than those of the subfields derived at stage 530, displaying the image based on the determined bit-depth values without any further processing for mitigating quantization effects can result in image artifacts such as banding, flatness, or false contouring. To reduce the potential for image quality degradation resulting from a reduction in the number of subframes associated with one or more color subfields, the subfield derivation logic 404 and subframe generation logic 406 can recalculate the color subfields for the image frame, applying a dithering operation appropriate for the remaining number of subframes of each color subfield. The dithering can be carried out with each color subfield or across color subfields, for example, by using vector error diffusion.

In some implementations, the subfield derivation logic 404, prior to or after the dithering, can implement a content adaptive backlight control (CABC) process. The CABC process scales down the intensity of the output of light sources for each subfield while increasing the pixel intensity values by a corresponding amount based on the maximum intensity values found in the subfield. The CABC process can be either a lossless or lossy process.

The subframe generation logic 408 processes the updated color subfields to generate a number of image subframes for each color subfield equal to the respective bit-depth value determined at stage 550 for that same color subfield (stage 570). Each subframe corresponds to a particular time slot in a time division gray scale image output sequence. It includes a desired state of each display element in the display for that time slot. In each time slot, a display element can take either a non-transmissive state or one or more states that allow for varying degrees of light transmission. In some implementations, the generated subframes include a distinct state value for each display element in the array of display elements 310 shown in FIG. 3.

In some implementations, the subframe generation logic 408 uses a code word lookup table (LUT) to generate the subframes. In some implementations the code word LUT stores series of binary values referred to as code words that indicate corresponding series of display element states that result in given pixel intensity values. The value of each digit in the code word indicates a display element state (for example, light or dark) and the position of the digit in the code word represents the weight that is to be attributed to the state. In some implementations, the weights are assigned to each digit in the code word such that each digit is assigned a weight that is twice the weight of a preceding digit. In some other implementations, multiple digits of a code word may be assigned the same weight. In some other implementations, each digit is assigned a different weight, but the weights may not all increase according to a fixed pattern, digit to digit.

To generate a set of subframes, the subframe generation logic 408 obtains code words for all pixels in a color subfield. The subframe generation logic 408 can aggregate the digits in each of the respective positions in the code words for the set of pixels in the subfield together into subframes. For example, the digits in the first position of each code word for each pixel are aggregated into a first subframe. The digits in the second position of each code word for each pixel are aggregated into a second subframe, and so forth. The subframes, once generated, can be stored in the frame buffer 308 shown in FIG. 3 or sent to output logic 410.

The output logic 410 causes the generated set of subframes to be displayed (stage 580). The output logic 410 can be configured to control output signals to a remainder of the components of the display apparatus 300 to cause the generated image subframes to be displayed. The output signals include signals indicative of state values of the display elements 310, electric current or voltage values for driving light sources, electric current or voltage values for driving electromechanical components of display elements, or other signals. Given that the generated set of subframes is fewer in number than the bit-depth levels associated with the color subfields after preprocessing (before reducing bit-depth levels), more time is available to display the remaining subframes. Accordingly, the output logic 410 can increase the illumination time durations of the remaining image subframes to allow the backlight to be illuminated at a lower intensity. For instance, the time that otherwise would have been allocated to addressing and illuminating dropped image subframes can be allocated to the illumination of the remaining image subframes. The time can be distributed among the subframes of the same color, all colors, or colors where most efficiency can be gained (e.g., light sources having steepest power curves). This allows the light sources to be illuminated at more power-efficient points on the respective power curves, reducing power consumption. Power consumption can further be decreased relative to the display of images using full complement of subframes, as the display need not expend power to address or activate the display elements of the display for as many subframes.

The illumination intensity of the light sources for each color subfield can be a function of the detected ambient light level. In general, higher levels of detected ambient light cause the control logic 400 to control the light sources to be illuminated at higher intensity. This intensity, however, can be decreased based on the results of the CABC process as well as the results of any bit-depth reduction determined at stage 550.

Figure 7A:
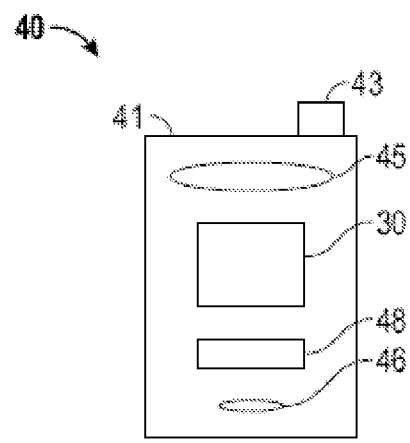
FIGS. 7A and 7B show system block diagrams of an example display device that includes a plurality of display elements.
Figure 7B:
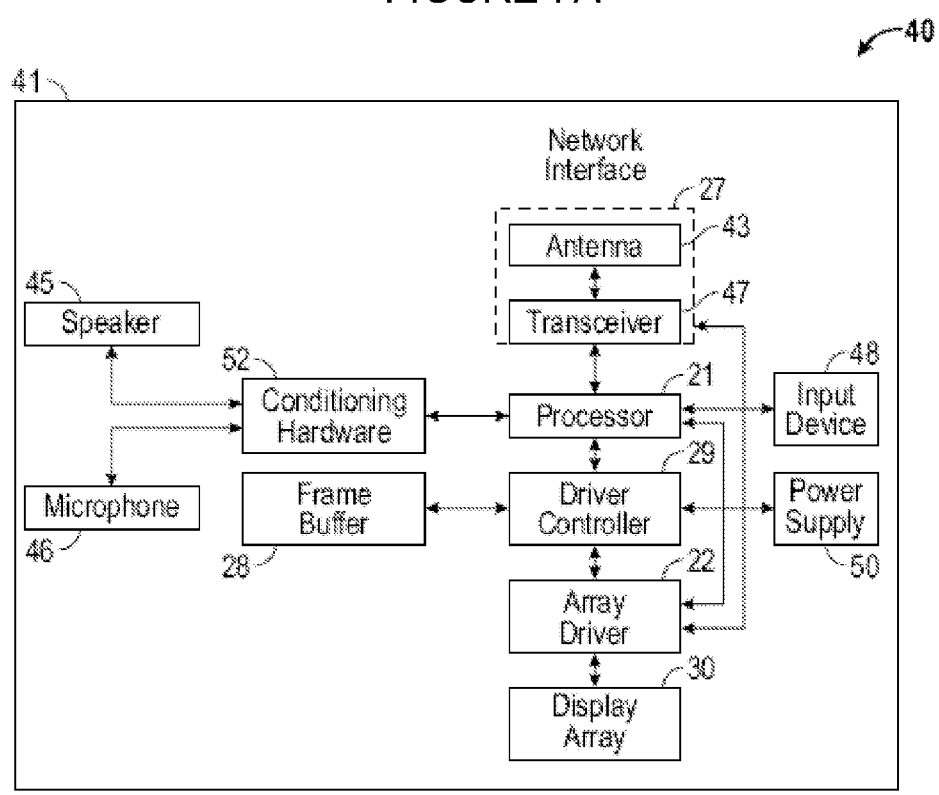

FIGS. 7A and 7B show system block diagrams of an example display device 40 that includes a plurality of display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be capable of including a flat-panel display, such as plasma, electroluminescent (EL) displays, OLED, super twisted nematic (STN) display, LCD, or thin-film transistor (TFT) LCD, or a non-flat-panel display, such as a cathode ray tube (CRT) or other tube device. In addition, the display 30 can include a mechanical light modulator-based display, as described herein.

The components of the display device 40 are schematically illustrated in FIG. 7B. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 7A, can be capable of functioning as a memory device and be capable of communicating with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to any of the IEEE 16.11 standards, or any of the IEEE 802.11 standards. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G, or further implementations thereof, technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29 is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements. In some implementations, the array driver 22 and the display array 30 are a part of a display module. In some implementations, the driver controller 29, the array driver 22, and the display array 30 are a part of the display module.

In some implementations, the driver controller 29, the array driver 22, and the display array 30 are appropriate for any of the types of displays described herein. For example, the driver controller 29 can be a conventional display controller or a bi-stable display controller (such as a mechanical light modulator display element controller). Additionally, the array driver 22 can be a conventional driver or a bi-stable display driver (such as a mechanical light modulator display element controller). Moreover, the display array 30 can be a conventional display array or a bi-stable display array (such as a display including an array of mechanical light modulator display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40. Additionally, in some implementations, voice commands can be used for controlling display parameters and settings.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware or software components and in various configurations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
a memory component storing mapping data, which maps a plurality of ambient illumination ranges to respective bit-depth values for each component color subfield of a plurality of component color subfields used to display an image, the mapping data including:
  a first bit-depth value associated with a first component color subfield of the component color subfields and mapped to a first ambient illumination range, and
  a second bit-depth value, different than the first bit-depth value, associated with the first component color subfield of the component color subfields and mapped to a second ambient illumination range that is different from the first ambient illumination range; and
a controller configured to:
  obtain an indication of an ambient illumination level;
  receive image data associated with an image frame;
  derive pixel intensity values for the component color subfields based on the received image data for displaying the image frame;
  determine for each of the component color subfields a respective number of subframes to be used to display the image frame, using the mapping data and the obtained ambient illumination level;
  generate a set of subframes for each component color subfield based on the determined respective number of subframes; and
  cause the image frame to be displayed according to the determined respective number of subframes.

2. The apparatus of claim 1, wherein the mapping data includes multiple lookup tables (LUTs), each LUT includes different mappings of ambient illumination ranges to respective numbers of subframes to be generated for the component color subfields.

3. The apparatus of claim 2, wherein the controller is further configured to select an LUT of the multiple LUTs based on at least one criterion.

4. The apparatus of claim 3, wherein the at least one criterion includes at least one of an application type associated with the image frame, a battery power level, user preferences, user modes, color composition of the image frame, and a color of a composite color employed in rendering the image frame.

5. The apparatus of claim 1, wherein the controller is further configured to apply a spatial dithering process to at least one component color subfield.

6. The apparatus of claim 1, wherein within an ambient illumination range, a first bit-depth value for a first component color subfield associated with a first luminance coefficient is smaller than a second bit-depth value for a second component color subfield associated with a second luminance coefficient larger than the first luminance coefficient.

7. The apparatus of claim 1, wherein within an ambient illumination range, a first bit-depth value for a first component color subfield associated with a first light source with a nonlinear relationship between respective input power and output light intensity is greater than a second bit-depth value for a second component color subfield associated with a second light source with a linear relationship between respective input power and output light intensity.

8. The apparatus of claim 1, wherein the controller is further configured to obtain illumination time durations associated with the generated subframes.

9. The apparatus of claim 1, wherein generating the number of subframes the controller is further configured to:
  update the derived component color subfields based on the determined respective number of subframes.

10. The apparatus of claim 1, further comprising:
a display including a plurality of display elements;
a processor capable of communicating with the display, the processor being capable of processing image data; and
a memory device capable of communicating with the processor.

11. The apparatus of claim 10, further comprising:
an image source module capable of sending the image data to the processor, wherein the image source module includes at least one of a receiver, transceiver, and transmitter.

12. The apparatus of claim 10, further comprising:
an input device capable of receiving input data and communicating the input data to the processor.

13. A non-transitory computer-readable medium comprising computer code instructions stored thereon, which when executed cause a processor to:
  obtain an indication of an ambient illumination level;
  receive image data associated with an image frame;
  derive pixel intensity values for a plurality of component color subfields based on the received image data for displaying the image frame;
  determine for each of the component color subfields a respective number of subframes to be used to display the image frame, using the obtained illumination level and mapping data, which maps a plurality of ambient illumination ranges to respective bit-depth values for each component color subfield of the plurality of component color subfields, the mapping data including: a first bit-depth value associated with a first component color subfield of the component color subfields and mapped to a first ambient illumination range, and a second bit-depth value, different than the first bit-depth value, associated with the first component color subfield of the component color subfields and mapped to a second ambient illumination range that is different from the first ambient illumination range;
  generate a set of subframes for each component color subfield based on the determined respective number of subframes; and
  display the image frame according to the determined respective number of subframes.

14. The non-transitory computer-readable medium of claim 13, wherein the mapping data includes one or more lookup tables (LUTs), each LUT includes mappings of ambient illumination ranges to respective numbers of subframes to be generated for the component color subfields.

15. The non-transitory computer-readable medium of claim 14, wherein the one or more LUTs include multiple LUTs and the computer code instructions when executed further cause the processor to select an LUT of the multiple LUTs based on at least one criterion.

16. The non-transitory computer-readable medium of claim 15, wherein the at least one criterion includes at least one of an application type associated with the image frame, a battery power level, user preferences, user modes, color composition of the image frame, and a color of a composite color employed in rendering the image frame.

17. The non-transitory computer-readable medium of claim 13, wherein the computer code instructions when executed further cause the processor to apply a spatial dithering process to at least one component color subfield.

18. The non-transitory computer-readable medium of claim 13, wherein within an ambient illumination range, a first bit-depth value for a first component color subfield associated with a first luminance coefficient is smaller than a second bit-depth value for a second component color subfield associated with a second luminance coefficient larger than the first luminance coefficient.

19. The non-transitory computer-readable medium of claim 13, wherein within an ambient illumination range, a first bit-depth value for a first component color subfield associated with a first light source with a nonlinear relationship between respective input power and output light intensity is greater than a second bit-depth value for a second component color subfield associated with a second light source with a linear relationship between respective input power and output light intensity.

20. The non-transitory computer-readable medium of claim 13, wherein the computer code instructions when executed further cause the processor to obtain illumination time durations associated with the generated subframes.

21. The non-transitory computer-readable medium of claim 13, wherein generating the number of subframes includes the computer code instructions when executed further causing the processor to update the derived component color subfields based on the determined respective number of subframes.

22. An apparatus comprising:
    means for storing mapping data, which maps a plurality of ambient illumination ranges to respective bit-depth values for each component color subfield of a plurality of component color subfields used to display an image, the mapping data including: a first bit-depth value associated with a first component color subfield of the component color subfields and mapped to a first ambient illumination range, and a second bit-depth value, different than the first bit-depth value, associated with the first component color subfield of the component color subfields and mapped to a second ambient illumination range that is different from the first ambient illumination range;
    means for obtaining an indication of an ambient illumination level;
    means for receiving image data associated with an image frame;
    means for deriving pixel intensity values for the component color subfields based on the received image data for displaying the image frame;
    means for determining for each of the component color subfields a respective number of subframes, based on the mapping data and the obtained illumination level, to be used to display the image frame;
    means for generating a set of subframes for each component color subfield based on the determined respective number of subframes; and
    means for causing the image frame to be displayed according to the determined respective number of subframes.

23. The apparatus of claim 22, wherein the mapping data includes multiple lookup tables (LUTs), each LUT includes different mappings of ambient illumination ranges to respective numbers of subframes to be generated for the component color subfields.

24. The apparatus of claim 23, wherein the apparatus further comprising means for selecting an LUT of the multiple LUTs based on at least one criterion.

25. The apparatus of claim 24, wherein the at least one criterion includes at least one of an application type associated with the image frame, a battery power level, user preferences, user modes, color composition of the image frame, and a color of a composite color employed in rendering the image frame.

26. The apparatus of claim 22, wherein within an ambient illumination range, a first bit-depth value for a first component color subfield associated with a first luminance coefficient is smaller than a second bit-depth value for a second component color subfield associated with a second luminance coefficient larger than the first luminance coefficient.

27. The apparatus of claim 22, wherein within an ambient illumination range, a first bit-depth value for a first component color subfield associated with a first light source with a nonlinear relationship between respective input power and output light intensity is greater than a second bit-depth value for a second component color subfield associated with a second light source with a linear relationship between respective input power and output light intensity.

28. The apparatus of claim 22, further comprising means for obtaining illumination time durations associated with the generated subframes.

29. The apparatus of claim 22, wherein the means for generating the number of subframes include means for updating the derived component color subfields based on the determined respective number of subframes.

30. The apparatus of claim 22 further comprising means for applying a spatial dithering process to at least one component color subfield.

* * * * *

UNITED STATES PATENT AND TRADEMARK OFFICE
CERTIFICATE OF CORRECTION

PATENT NO. : 9,613,587 B2
APPLICATION NO. : 14/601065
DATED : April 4, 2017
INVENTOR(S) : Mark Halfman et al.

It is certified that error appears in the above-identified patent and that said Letters Patent is hereby corrected as shown below:

On the Title Page

The name of the third inventor should read:
Taketoshi Nakano, Tokyo (JP)

Signed and Sealed this
Sixteenth Day of January, 2018

Joseph Matal
*Performing the Functions and Duties of the
Under Secretary of Commerce for Intellectual Property and
Director of the United States Patent and Trademark Office*